Dec. 4, 1962  A. B. WIGHT  3,067,419
ANTENNA BEAM SCANNING SYSTEM
Filed Jan. 8, 1959  3 Sheets-Sheet 1

INVENTOR
ALBERT B. WIGHT

BY  *Fred Jacob*

ATTORNEY

Dec. 4, 1962 A. B. WIGHT 3,067,419
ANTENNA BEAM SCANNING SYSTEM
Filed Jan. 8, 1959 3 Sheets-Sheet 2

INVENTOR
ALBERT B. WIGHT
BY *Fred Jacob*
ATTORNEY

Dec. 4, 1962 A. B. WIGHT 3,067,419
ANTENNA BEAM SCANNING SYSTEM
Filed Jan. 8, 1959 3 Sheets-Sheet 3

INVENTOR
ALBERT B. WIGHT

BY *Fred Jacob*
ATTORNEY

United States Patent Office 3,067,419
Patented Dec. 4, 1962

3,067,419
ANTENNA BEAM SCANNING SYSTEM
Albert B. Wight, Quincy, Mass., assignor to Laboratory For Electronics, Inc., Boston, Mass., a corporation of Delaware
Filed Jan. 8, 1959, Ser. No. 785,649
4 Claims. (Cl. 343—17.1)

The present invention relates in general to new and improved apparatus for detecting targets by means of radar, in particular radar traffic control systems. In general, all radars are subject to a coverage problem which compromises the capabilities of the radar system to detect targets over a sufficient volume of space. This is particularly true of relatively short range systems such as airport surveillance radar systems, where the beam range is sufficiently short so that the conventional beam width angle in the elevation plane does not provide the necessary altitude coverage to detect, and hence control, all traffic in the terminal area. More specifically, the space sector in the terminal area which must be covered in order to obtain adequate traffic control is larger in the elevation plane than the conventional beam width in the same plane of a radar beam scanning in the azimuth plane.

Prior attempts at solving this problem were generally directed to increasing the beam width in the elevation plane with the result that the range performance was materially reduced and ground clutter was increased owing to the low side cut-off characteristics of the antenna. Alternative solutions used a conventional beam which was elevated to scan the upper portion of the sector leaving the lower portion without effective traffic control beyond very close range.

Accordingly, it is a primary object of the invention to provide radar apparatus which will overcome the foregoing disadvantages.

It is another object of the invention to provide radar apparatus capable of providing target detection by raster scanning a predetermined space sector having a dimension normal to the direction of scan which is greater than the beam width in the corresponding direction.

It is a further object of the invention to provide radar scanning apparatus capable of providing effective traffic control in a predetermined space sector which is larger in a plane normal to the direction of scan than the corresponding beam width, by cyclically shifting the beam to successive positions in said plane during the scanning operation.

These and other novel features of the invention together with further objects and advantages thereof will become apparent from the following detailed specification with reference to the accompanying drawings in which.

Figure 1:
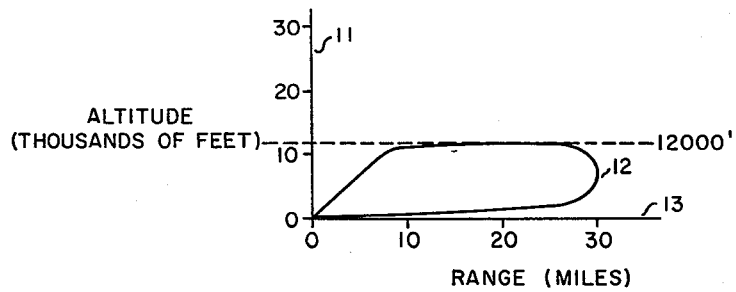
FIG. 1 illustrates the vertical coverage pattern of a radar beam of the type in use in a typical airport surveillance radar.

With reference now to the drawings and particularly FIG. 1 thereof, the altitude coverage pattern of a typical prior art airport surveillance radar (ASR) system is illustrated. Although the invention is not limited to such systems, it will be understood that for purposes of illustration herein an azimuth antenna is used and ordinate 11 represents a vertical axis about which beam 12 rotates. Abscissa 13 represents ground with relation to the beam and the crossover point of axes 11 and 13 represents the approximate location of the antenna. Under ordinary conditions, ASR systems are intended to provide such target detection ability in a predetermined space sector comprising the terminal area that traffic control is possible therein. In FIG. 1, the space sector would extend into and out of the plane of the drawing, as determined by the scanning angle of the beam when the latter oscillates about axis 11. While under typical conditions a beam range of approximately 30 miles is obtainable as shown in the drawing, it will be noted that altitude coverage is limited to the 12,000 to 14,000 foot level. The foregoing figures apply to a particular target of constant radar cross section with all radar constants except antenna characteristics held constant.

Figure 2:
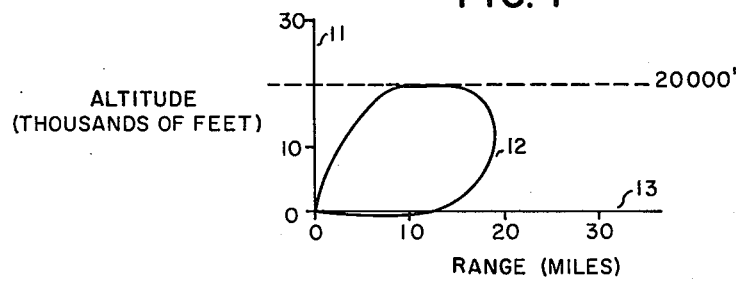
FIG. 2 represents one prior art attempt at obtaining increased covarage in the elevation plane.

Generally speaking, such altitude performance is insufficient for adequate coverage of the entire space sector wherein traffic control is desired. The altitude covered should be in excess of 20,000 feet but is not practically achievable with systems of the type available heretofore. One obvious expedient of achieving higher altitude coverage is to increase the beam width, as illustrated in FIG. 2. The latter method results in a drastic reduction in range performance, such reduction being proportional to the square root of the increase in antenna beam width. In the case under consideration herein, the resultant beam range is approximately 18 miles. Additionally, the low side cut-off characteristics of the antenna are broadened whereby low altitude coverage is reduced and ground clutter return is increased. This is illustrated schematically in FIG. 2 by the interference of beam 12 with abscissa 13. Applicable reference numerals from FIG. 1 have been retained in this and subsequent figures.

Figure 3:
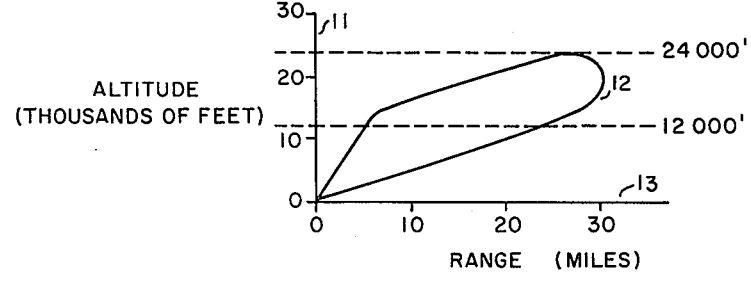
FIG. 3 illustrates a prior art attempt at obtaining coverage at a higher altitude without loss of range.

Another alternative is illustrated in FIG. 3. Here, the total sector coverage is not increased, but a different sector portion is scanned by tilting beam 12 at a greater angle during the scanning operation. It will be understood that, although the beam range is not decreased from that obtainable with the arrangement of FIG. 1, the change of beam position leaves the lower segment of the space sector without adequate range coverage.

The problem discussed above is not confined to airport surveillance radar systems but is confronted in any surveillance system although perhaps to a lesser degree. Similarly, the problem arises in height finder radars where scanning occurs in the elevation plane and the limited azimuth coverage of the system impairs either the acquisition of a particular target or the capability to examine more than one target simultaneously at somewhat different bearing angles.

The invention which forms the subject matter of this application provides for raster scanning of a predetermined space sector by the use of apparatus adapted to beam scan one dimension of the space sector while changing the beam position in a direction normal to the direction of scanning. More specifically, a plurality of antenna feeds are provided and transmitted microwave energy is sequentially switched to respective feeds. These feeds are positioned such that the antenna pattern due to each remains essentially unchanged in the scanning plane, while the pattern in a plane normal to the latter is shifted by somewhat less than the full beam width during the scanning operation. The sequencing operation is so arranged as to give maximum performance for the particular system application. Thus, microwave energy may be switched to a different feed upon the completion of each scan or, alternatively, successive pulses of microwave energy may be sequentially applied to different feeds.

Figure 4:
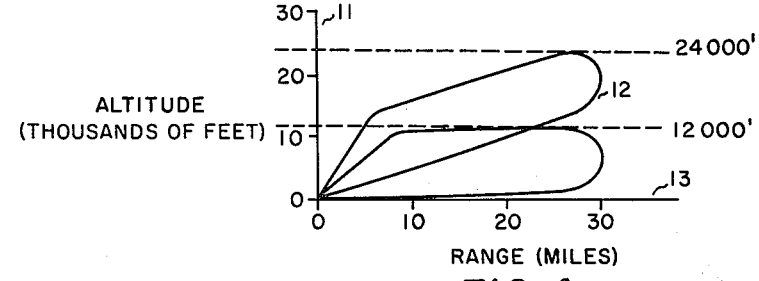
FIG. 4 illustrates the coverage pattern obtained by the invention herein which combines the patterns of FIGS. 1 and 3.

FIG. 4 illustrates a typical coverage pattern obtainable by means of the aforesaid raster scan and ideally represents the sum of the coverage patterns shown in FIGS. 1 and 3. It will be noted that complete coverage of the predetermined space sector is obtained at only slightly reduced range, without the introduction of any additional ground clutter return. By sequentially energizing different feeds during the scanning operation, raster scanning of the space sector results by sequentially occurring radar beams which are respectively displaced from each other in a plane normal to the direction of scan. If the raster scan is carried out on a scan-to-scan basis, i.e. if a different feed is energized upon the completion of each scan, the beam information rate is decreased. This is true since targets positioned outside the overlapping portion of the two beams spaced from each other, will be detected only on every other scan. If, for tactical reasons, a decrease in the information rate is not permissible, sequential switching of the microwave energy can be carried out on a pulse-to-pulse basis where successive pulses of energy are sequentially switched to respective feeds. In the latter case, the number of hits per beam width will be reduced by the number of separate feeds provided, i.e. by two in the case illustrated in FIG. 4. In either method, some range performance is sacrificed. In the scan-to-scan method the blip scan ratio, which is defined as the percentage of total time the target is seen, is reduced and the beam range is compromised somewhat. The reduction in range from the maximum obtainable is a function of the scan rate here. At slow scan rates, where no noise integration is involved on the cathode ray viewing tube, there is no decrease in range performance. As the scan rate increases, the loss of range approaches that suffered in the pulse-to-pulse method explained hereinbelow. In neither case, however, is the range loss as great as that suffered by increasing the beam width in the manner illustrated in FIG. 2, where the decrease varies as the square root of the increase in antenna beam width.

Figure 5:
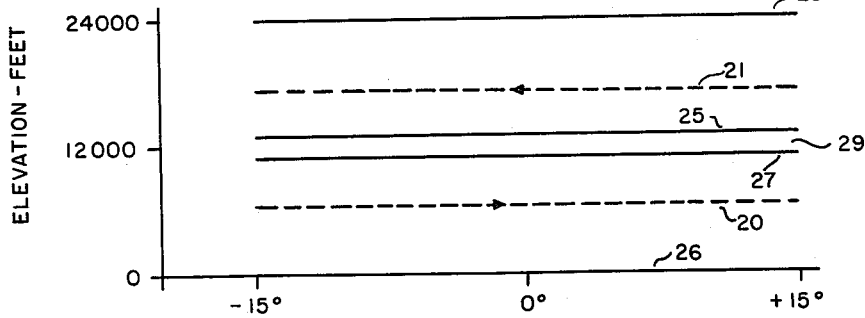
FIG. 5 illustrates a frontal view of the coverage pattern of FIG. 4 using scan-to-scan operation.

FIG. 5 represents a front view of the coverage pattern of FIG. 4 on a scan-to-scan basis, as viewed from a position beyond the nose of the beam. The dotted lines 20 and 21 and the arrows thereon represent the paths of motion of the center of the beam nose in different beam positions. The pair of solid lines 25, 26 indicate the 3 db points of the beam itself and hence they represent coverage of a segment of the space sector in the lower beam position. As shown in the drawings, the 3 db points occur approximately at ground and at the 12,000 foot level respectively. Lines 27 and 28 represent coverage in the upper beam position, the 3 db points occurring approximately at the 12,000 and 24,000 foot levels respectively. It will be noted that an overlapping area 29 exists which is scanned in both beam positions to prevent the possibility of any portion of the space sector from remaining without coverage. An electrical scanning angle of ±15° is used herein, the actual mechanical scanning angle being of the order of ±21°. As shown in the drawing, a scanning discontinuity occurs during position step-shifting of the antenna beam at both extremes between paths 20 and 21 respectively.

Figure 6:
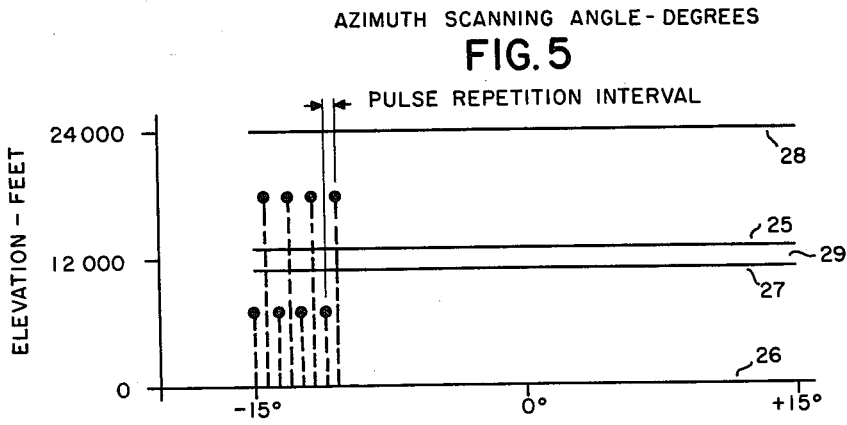
FIG. 6 illustrates a frontal view of the scanning pattern of FIG. 4 using pulse-to-pulse operation.

FIG. 6 illustrates the coverage pattern of FIG. 4 on a pulse-to-pulse basis. In contradistinction to the method set forth in connection with FIG. 5, the beam position in this arrangement is shifted at pulse repetition intervals such that successive pulses of microwave energy produce beams at different positions. In this embodiment, the number of shifts per scan is a function of the pulse repetition interval, the scan rate and the scanning angle. As an example, a total scanning angle of 30° may be scanned in half a second at a pulse repetition frequency of 1500 cycles.

The pulse-to-pulse shift method is normally used only where the sacrifice of information rate of the scan-to-scan method cannot be tolerated. The reason therefor resides in the inherently reduced range performance of this method which is due to three factors: First, the range is reduced by $$R \approx \sqrt[4]{\frac{1}{N}}$$

where N is the number of scan feeds. Secondly, since the hits per beam width are reduced by N, target scintillation has a greater effect and the probability of detection is reduced for small targets. Thirdly, the effect of clutter and precipitation return from the N feeds competes with the target return from only one feed. Here, N is obviously limited to the condition of at least one hit per beam width.

Figure 7:
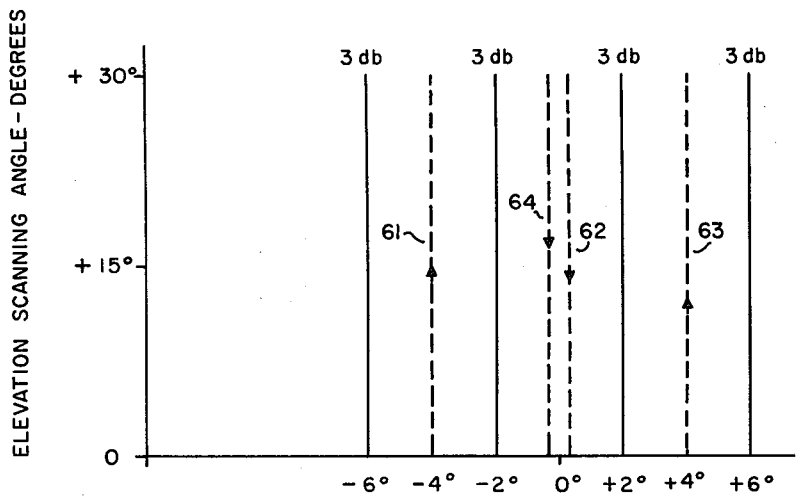
FIG. 7 illustrates the coverage pattern obtained by applying the invention to a typical height finder radar using scan-to-scan operation.

FIG. 7 illustrates the application of the invention herein to a height finder radar wherein scanning proceeds in the elevation plane and the beam position shift occurs in the azimuth plane. As in the case of FIG. 5, the dotted lines 61, 62, 63 and 64 and their associated arrow heads indicate the paths of the nose of the radar beam, step shifting occurring in the order of the aforesaid reference numerals. In the instant case, the solid vertical lines are representative of the 3 db points of the beam itself in respective azimuth positions. As in the case of FIGS. 5 and 6, partial overlap is provided in successive beam positions so as to leave no portion of the space sector without coverage. This is shown in part by area 65 contained between dotted line paths 64 and 62 in the central beam position. For the sake of clarity no overlap of solid lines is shown. The central portion of the space sector between +2° and −2° is scanned twice as many times as either side portion. Although not necessary, this is a useful feature inasmuch as the target is normally in beam center with the resultant increased probability of detection.

Figure 8:
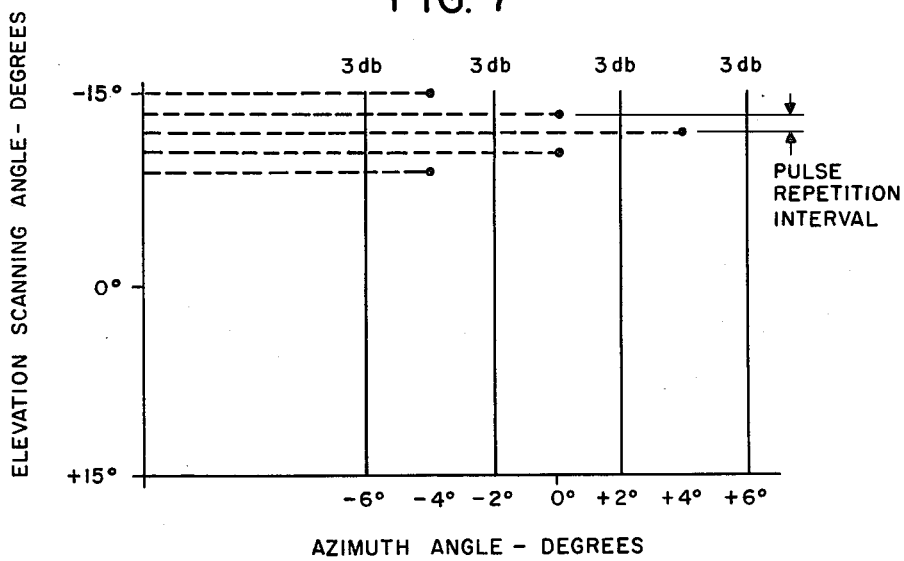
FIG. 8 illustrates the coverage pattern of apparatus similar to the one employed to obtain the pattern of FIG. 7 but using pulse-to-pulse operation.

FIG. 8 illustrates the coverage pattern of a height finder radar similar to that shown in FIG. 7. In the instant case a pulse-to-pulse scan is used in order to obtain the desired coverage. As in the case of FIG. 7, the central portions of the span sector is scanned twice as much as either side portion.

Figure 9:
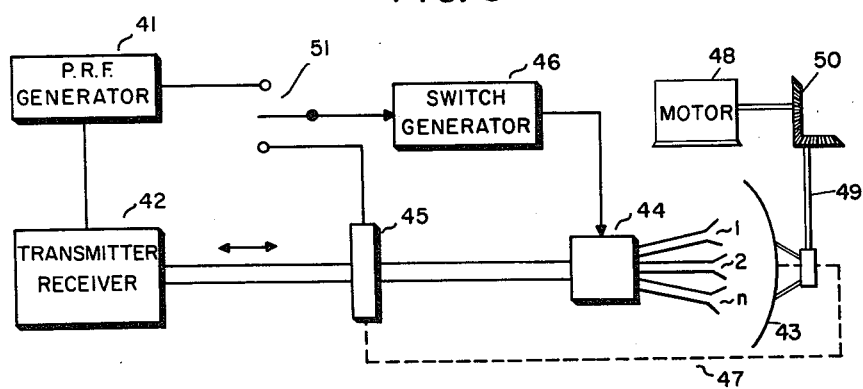
FIG. 9 illustrates apparatus for carrying out the invention to obtain the foregoing coverage patterns.

FIG. 9 illustrates in schematic form an embodiment of the invention which is selectively capable of operating on a pulse-to-pulse basis as well as on a scan-to-scan basis. A pulse repetition frequency generator 41 powers a transmitter-receiver 42 which receives microwave energy from the antenna or supplies it thereto. An antenna reflector 43 is adapted to be oscillated about a vertical axis lying in the plane of the drawing. A microwave switch 44 and associated antenna feeds 1, 2 ... n are adapted to oscillate with the reflector. The means for actuating the antenna are symbolically represented in the drawing by the motor 48 driving the shaft 49 through bevel gearing 50. The shaft 49 is fixed to the reflector and is the vertical axis about which the reflector oscillates. A rotary switch 45 is linked mechanically by means of coupling 47 to the antenna or its drive mechanism such that microwave energy is properly transmitted to the antenna feeds or received therefrom for further transmission to the receiver. A switch generator 46 is adapted to provide the proper pulses in order to actuate switch 44 such that energy is supplied to the proper antenna feeds. The connection between the switch generator and switch 44 need not be an electrical one but could properly consist of a mechanical linkage.

When the system is operated on a scan-to-scan basis, as explained above, switch 51 is in its down position such that the switch generator is coupled to rotary joint 45. Under these conditions the operation of the switch generator, and hence of switch 44, is directly controlled from the rotary joint whose operation in turn is synchronized with the scanning motion of the antenna. Thus, a pulse may be generated by the switch generator upon the completion of each antenna scan to actuate switch 44 such that energy supplied to one feed is transferred to the next feed. Where the system is operated on a pulse-to-pulse basis, switch 51 is set in its position so that the switch generator is operated in synchronism with the output of pulse repetition generator 41. In this case, a pulse is produced by the switch generator in response to each pulse received from generator 41, such that a different feed is energized by switch 44 during each pulse repetition interval.

The system described in connection with FIG. 9 is representative of only one embodiment of the invention and various modifications are possible. Thus, the scanning operation need not necessarily proceed on a mechanical basis but may be carried out by electronic means in a manner well known in the art. Accordingly, antenna feeds 1, 2 . . . n are additionally intended to be representative of such means, e.g. dipole arrays. In the latter case, switch 44 is operative to energize the desired array during the scanning operation. The latter method is applicable to the scan-to-scan operation described above as well as to the pulse-to-pulse operation. Further departures are possible in the manner of energizing respective feeds in order to obtain a radar beam sequentially displaced during the scanning operation in a direction normal to the direction of scan.

By the use of a plurality of antenna feeds sequentially energized during the scanning operation, the invention herein provides a raster scan which permits target detection, and hence traffic control, in a space sector far greater than is normally susceptible of adequate coverage. Such coverage is obtained without significant loss of beam range and without any increase in ground clutter return.

Having thus described the invention, it will be apparent that numerous modifications and departures, as explained above, may now be made by those skilled in the art, all of which fall within the scope contemplated by the invention. Consequently, the invention herein disclosed is to be construed as limited only by the spirit and scope of the appended claims.

What is claimed is:

1. Radiant beam energy apparatus comprising a reflector, a plurality of antenna feeds respectively disposed in focal relationship to said reflector, means for angularly scanning said reflector, and means for switching energy to a different feed synchronously upon the completion of each scan.

2. In a radar system adapted to beam scan a predetermined space sector to detect targets therein, a source of high frequency pulses, a transmitter-receiver adapted to be energized from said source, an antenna comprising a reflector, means for oscillating said reflector about an axis, a plurality of antenna feeds respectively disposed in focal relationship to said antenna and arranged to provide respective beams displaced from each other in a direction normal to the direction of scan, a rotary joint adapted to provide a high frequency energy coupling with said transmitter-receiver, said rotary joint being mechanically linked to said oscillating means to synchronize its operation therewith, a switching unit adapted to couple respective ones of said feeds in sequence to said rotary joint, a switch generator adapted to synchronize the sequence of operation of said switching unit with a reference, and means for selectively referencing said switch generator to said pulse source or to said rotary joint.

3. Radar apparatus for repeatedly beam scanning about an axis to cover a predetermined space sector, the space sector having a first dimension determined by the electrical scanning angle and a second dimension substantially normal to the direction of scan, the apparatus comprising a source of microwave pulse energy, a plurality of electronic scanning arrays adapted to be energized from the microwave source, each array providing its own beam of high frequency energy, sweep means for causing the beam of each array to sweep across the space sector whereby a segment of the sector is scanned, the arrays being disposed to cause adjacent sector segments to partially overlap in the second direction of the space sector, and means for sequentially energizing the arrays, the sequential energizing means comprising means synchronized with the sweep means to switch energy to a different array upon completion of each beam sweep.

4. Radar apparatus for repeatedly beam scanning about an axis to cover a space sector, the space sector having a first dimension determined by the electrical scanning angle and a second dimension substantially normal to the direction of scan, the apparatus comprising: an antenna mounted for rotation about the aforesaid axis, the antenna having a reflector and a plurality of feeds disposed in focal relationship to the reflector, each of the feeds being adapted to cooperate with the reflector to provide a beam of high frequency energy, means for oscillating the antenna at a predetermined scan rate to cause each of the beams to scan a segment of the space sector, the antenna feeds being arranged to cause partial overlap of the sector segments in the second direction, means for sequentially energizing respective feeds to scan adjacent sector segments in succession, a source of microwave source to a different feed upon completion means comprising means synchronized with the scan rate of the oscillating antenna to switch energy from the microwave source to a different feed upon completion of each scan so that the entire space sector is cyclically swept by the overlapping beam.

References Cited in the file of this patent

UNITED STATES PATENTS

| 2,436,380 | Cutler | Feb. 24, 1948 |
| 2,532,566 | Millman | Dec. 5, 1950 |
| 2,563,990 | Cutler | Aug. 14, 1951 |
| 2,648,038 | Morse | Aug. 4, 1953 |
| 2,682,048 | Longacre | June 22, 1954 |
| 2,693,583 | Rigrod | Nov. 2, 1954 |

FOREIGN PATENTS

| 677,913 | Great Britain | Aug. 27, 1952 |
| 1,146,901 | France | May 27, 1957 |

UNITED STATES PATENT OFFICE
CERTIFICATE OF CORRECTION

Patent No. 3,067,419

December 4, 1962

Albert B. Wight

It is hereby certified that error appears in the above numbered patent requiring correction and that the said Letters Patent should read as corrected below.

Column 6, line 42, for "source to a different feed upon completion" read -- pulse energy, and the sequential energization --.

Signed and sealed this 14th day of May 1963.

(SEAL)
Attest:

ERNEST W. SWIDER
Attesting Officer

DAVID L. LADD
Commissioner of Patents